United States Patent
Claussen et al.

(10) Patent No.: US 12,365,367 B1
(45) Date of Patent: Jul. 22, 2025

(54) BATTERY POWERED LOCOMOTIVE

(71) Applicant: Knoxville Locomotive Works, Inc., Knoxville, TN (US)

(72) Inventors: Pete Claussen, Knoxville, TN (US); Scott Gatewood, Knoxville, TN (US); Michael Thomason, Knoxville, TN (US); Todd Burchette, Knoxville, TN (US)

(73) Assignee: Knoxville Locomotive Works, Inc., Knoxville, TN (US)

( * ) Notice: Subject to any disclaimer, the term of this patent is extended or adjusted under 35 U.S.C. 154(b) by 0 days.

(21) Appl. No.: 19/188,285

(22) Filed: Apr. 24, 2025

Related U.S. Application Data

(60) Provisional application No. 63/721,099, filed on Nov. 15, 2024.

(51) Int. Cl.

| | |
|---|---|
| *B61C 17/06* | (2006.01) |
| *B60L 50/52* | (2019.01) |
| *B61C 9/38* | (2006.01) |
| *B61H 9/06* | (2006.01) |
| *H02J 1/14* | (2006.01) |
| *H02J 7/14* | (2006.01) |
| *H02P 3/14* | (2006.01) |

(52) U.S. Cl.
CPC .............. *B61C 17/06* (2013.01); *B60L 50/52* (2019.02); *B61C 9/38* (2013.01); *B61H 9/06* (2013.01); *H02J 1/14* (2013.01); *H02J 7/1423* (2013.01); *H02P 3/14* (2013.01); *B60L 2200/26* (2013.01)

(58) Field of Classification Search
CPC . B61C 9/38; B61C 17/06; B60L 50/52; B60L 2200/26; B61H 9/06; H02J 1/14; H02J 7/1423; H02P 3/14
See application file for complete search history.

(56) References Cited

U.S. PATENT DOCUMENTS

| | | |
|---|---|---|
| 6,308,639 B1 | 10/2001 | Donnelly et al. |
| 6,591,758 B2 | 7/2003 | Kumar |
| 6,612,245 B2 | 9/2003 | Kumar et al. |
| 6,612,246 B2 | 9/2003 | Kumar |
| 6,615,118 B2 | 9/2003 | Kumar |
| 7,064,507 B2 | 6/2006 | Donnelly et al. |
| 7,084,602 B2 | 8/2006 | Donnelly et al. |

(Continued)

FOREIGN PATENT DOCUMENTS

CN 101274594 A 10/2008

*Primary Examiner* — Robert J McCarry, Jr.
(74) *Attorney, Agent, or Firm* — Luedeka Neely, P.C.

(57) ABSTRACT

A locomotive comprises a DC power bus, traction motors, batteries, and a charging source, but has no prime mover engine. Each traction motor includes armature and field windings connected in parallel across the DC power bus. The batteries provide power to the DC power bus when in a motoring mode, and receive power from the DC power bus when in a charging mode and a dynamic braking mode. The charging source is connected across the DC power bus to provide charging power to the batteries when in the charging mode. The traction motors also provide charging power to the batteries when in the dynamic braking mode. The power from the charging source is less than the power that would be provided by a prime mover engine. The charging source provides no power to the traction motors when in the charging mode.

17 Claims, 5 Drawing Sheets

(56) References Cited

U.S. PATENT DOCUMENTS

| | | |
|---|---|---|
| 7,124,691 B2 | 10/2006 | Donnelly et al. |
| 7,190,133 B2 | 3/2007 | King et al. |
| 7,304,445 B2 | 12/2007 | Donnelly |
| 7,309,929 B2 | 12/2007 | Donnelly et al. |
| 7,349,797 B2 | 3/2008 | Donnelly et al. |
| 7,467,830 B2 | 12/2008 | Donnelly |
| 7,507,500 B2 | 3/2009 | Donnelly et al. |
| 7,514,807 B2 | 4/2009 | Donnelly et al. |
| 7,518,254 B2 | 4/2009 | Donnelly et al. |
| 7,554,278 B2 | 6/2009 | Wegner-Donnelly et al. |
| 7,565,867 B2 | 7/2009 | Donnelly et al. |
| 7,661,370 B2 | 2/2010 | Pike et al. |
| 7,667,347 B2 | 2/2010 | Donnelly et al. |
| 7,906,862 B2 | 3/2011 | Donnelly et al. |
| 7,940,016 B2 | 5/2011 | Donnelly et al. |
| 7,944,081 B2 | 5/2011 | Donnelly et al. |
| 7,966,945 B1 | 6/2011 | Miller et al. |
| 7,971,538 B1 | 7/2011 | Miller et al. |
| 8,006,627 B1 | 8/2011 | Miller et al. |
| 8,117,969 B1 | 2/2012 | Miller et al. |
| 8,136,454 B2 | 3/2012 | Barbee et al. |
| 8,171,860 B1 | 5/2012 | Miller et al. |
| 8,220,572 B2 | 7/2012 | Donnelly |
| 8,237,384 B2 | 8/2012 | Tarnow et al. |
| 8,244,419 B2 | 8/2012 | Wegner-Donnelly et al. |
| 8,342,103 B2 | 1/2013 | Barbee et al. |
| 8,371,230 B2 * | 2/2013 | Kumar ............... B61C 7/04 105/35 |
| 8,381,658 B1 | 2/2013 | Miller et al. |
| 8,408,114 B1 | 4/2013 | Tan |
| 8,536,824 B2 | 9/2013 | St-Jacques |
| 8,587,260 B2 | 11/2013 | Kumar |
| 8,640,629 B2 | 2/2014 | Barbee et al. |
| 8,677,908 B2 | 3/2014 | Kanda |
| 8,941,956 B2 | 1/2015 | Tarnow et al. |
| 9,102,309 B2 | 8/2015 | Tarnow et al. |
| 9,186,997 B2 | 11/2015 | Kanda |
| 9,193,268 B2 | 11/2015 | Kumar |
| 9,751,540 B2 | 9/2017 | Cook |
| 9,975,435 B2 | 5/2018 | Salomonsen |
| 10,730,392 B2 | 8/2020 | Montione |
| 11,999,241 B2 | 6/2024 | Beltramin et al. |
| 2008/0246338 A1 | 10/2008 | Donnelly et al. |
| 2008/0264291 A1 | 10/2008 | Pike et al. |
| 2008/0290825 A1 | 11/2008 | St-Jacques et al. |
| 2011/0257824 A1 | 10/2011 | Couchene et al. |
| 2020/0004772 A1 | 1/2020 | Maybee et al. |
| 2020/0047724 A1 | 2/2020 | Mattinson et al. |

\* cited by examiner

BATTERY POWERED LOCOMOTIVE

FIELD

This disclosure relates to the field of locomotives. More particularly, the disclosure relates to battery powered locomotives that do not have a prime mover engine.

BACKGROUND

Improvement is desired in construction and operation of locomotives. What is desired is a locomotive system configured to improve fuel economy, reduce emissions, and lower operational costs.

The present disclosure advantageously provides a battery powered locomotive that does not have a prime mover engine. As used herein, the term "prime mover engine" refers to an engine having a power output of at least about 1000 horsepower as is equal to the power required for the traction motors of the locomotive to cause continuous movement of the locomotive when operating in a motoring mode, which is an operational mode in which the traction motors of the locomotive cause the wheels of the locomotive to continuously turn throughout the operational speed range of the locomotive of up to at least about 60 mph.

The only fuel requirements of preferred embodiments of the locomotive is the fuel required to run a battery charging source, such as a small gas/diesel generator that is used solely for charging on-board batteries. The on-board batteries provide all electrical power requirements of the locomotive.

SUMMARY

The above and other needs are met by improved battery powered locomotives and battery powered locomotive consists. In one aspect, a battery powered locomotive according to the disclosure includes a DC power bus, one or more traction motors, batteries, a charging source, and a power dissipation device. The DC power bus provides a DC voltage to components of the locomotive when the locomotive is operating in a motoring mode, a charging mode, or a dynamic braking mode. The batteries are connected across the DC power bus for providing power to the DC power bus when the locomotive is operating in the motoring mode, and for receiving power from the DC power bus when the locomotive is operating in the charging mode and the dynamic braking mode. Each traction motor comprises an armature winding and a field winding that are selectively connected in parallel across the DC power bus. The traction motors are operable to receive power from the DC power bus when the locomotive is operating in the motoring mode, to provide charging power to the batteries when the locomotive is operating in the dynamic braking mode, and to receive no power from the DC power bus when the locomotive is operating in the charging mode. The charging source is connected across the DC power bus for providing charging power to the plurality of batteries. The charging power provided by the charging source is less than the total power required by the one or more traction motors when the locomotive is operating in the motoring mode. The power dissipation device is selectively connected across the DC power bus for receiving and dissipating excess power from the DC power bus when the locomotive is operating in the dynamic braking mode.

In some embodiments, the DC power bus comprises a DC auxiliary bus, a DC battery bus, and a DC traction bus. The DC auxiliary bus is connected to the DC battery bus, and the DC battery bus is connected to the DC traction bus. The armature winding and the field winding of each of the traction motors are selectively connected in parallel across the DC traction bus. Also, the batteries are connected across the DC battery bus, and the charging source is selectively connected across the DC auxiliary bus. When the locomotive is operating in the charging mode, the DC auxiliary bus is connected to the DC battery bus. When the locomotive is operating in the motoring mode and the dynamic braking mode, the DC battery bus is connected to the DC traction bus.

In some embodiments, the locomotive includes one or more first switches for selectively connecting the DC auxiliary bus to the DC battery bus, one or more second switches for selectively connecting the DC battery bus to the DC traction bus, and one or more third switches for selectively connecting the armature winding and the field winding across the DC traction bus. A controller generates control signals to control states of the first, second, and third switches.

In some embodiments, the locomotive includes one or more first chopper circuits for controlling a first voltage and a first current provided across the armature winding of the one or more traction motors when the locomotive is operating in the motoring mode, and one or more second chopper circuits for controlling a second voltage and a second current provided across the field winding of the one or more traction motors when the locomotive is operating in the motoring mode. The controller generates control signals to control the first and second chopper circuits to provide the first voltage, first current, second voltage, and second current.

In some embodiments, the one or more first chopper circuits control a third voltage and a third current provided across the armature winding of the one or more traction motors when the locomotive is operating in the dynamic braking mode, and the one or more second chopper circuits control a fourth voltage and a fourth current provided across the field winding of the one or more traction motors when the locomotive is operating in the dynamic braking mode. The controller generates the control signals to control the first and second chopper circuits to provide the third voltage, third current, fourth voltage, and fourth current.

In some embodiments, the locomotive includes one or more third chopper circuits for controlling excess power provided to the power dissipation device when the locomotive is operating in the dynamic braking mode. The controller generates the control signals to control the one or more third chopper circuits to provide the excess power to the power dissipation device.

In some embodiments, the first and second chopper circuits provide zero voltage and zero current across the armature and field windings of the traction motors when the locomotive is operating in the charging mode.

In some embodiments, the power dissipation device comprises a resistor grid.

In some embodiments, the charging source comprises an A C generator and rectifier.

In some embodiments, the charging source provides a voltage ranging from 530 VDC to 800 VDC to the DC power bus when the locomotive is operating in the charging mode.

In some embodiments, the batteries provide a voltage ranging from 530 VDC to 800 VDC to the DC power bus when the locomotive is operating in the motoring mode.

In some embodiments, the traction motors provide a voltage ranging from 530 VDC to 800 VDC to the DC power bus when the locomotive is operating in the dynamic braking mode.

In some embodiments, the batteries provide power to the DC power bus for powering the one or more traction motors at all operational speeds of the locomotive when the locomotive is operating in the motoring mode.

In some embodiments, the traction motors are operable to provide charging power to the batteries at all operational speeds of the locomotive when the locomotive is operating in the dynamic braking mode.

In some embodiments, the one or more traction motors comprise one or more DC motors, each having an armature winding and a field winding that are separately-excited and connected in parallel across the DC power bus.

In some embodiments, the one or more traction motors comprise one or more AC motors, each receiving AC power through one or more power invertors connected across the DC power bus.

In some embodiments, the one or more first chopper circuits and the one or more second chopper circuits comprise DC chopper circuits.

In some embodiments, the one or more first chopper circuits and the one or more second chopper circuits comprise AC chopper circuits.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
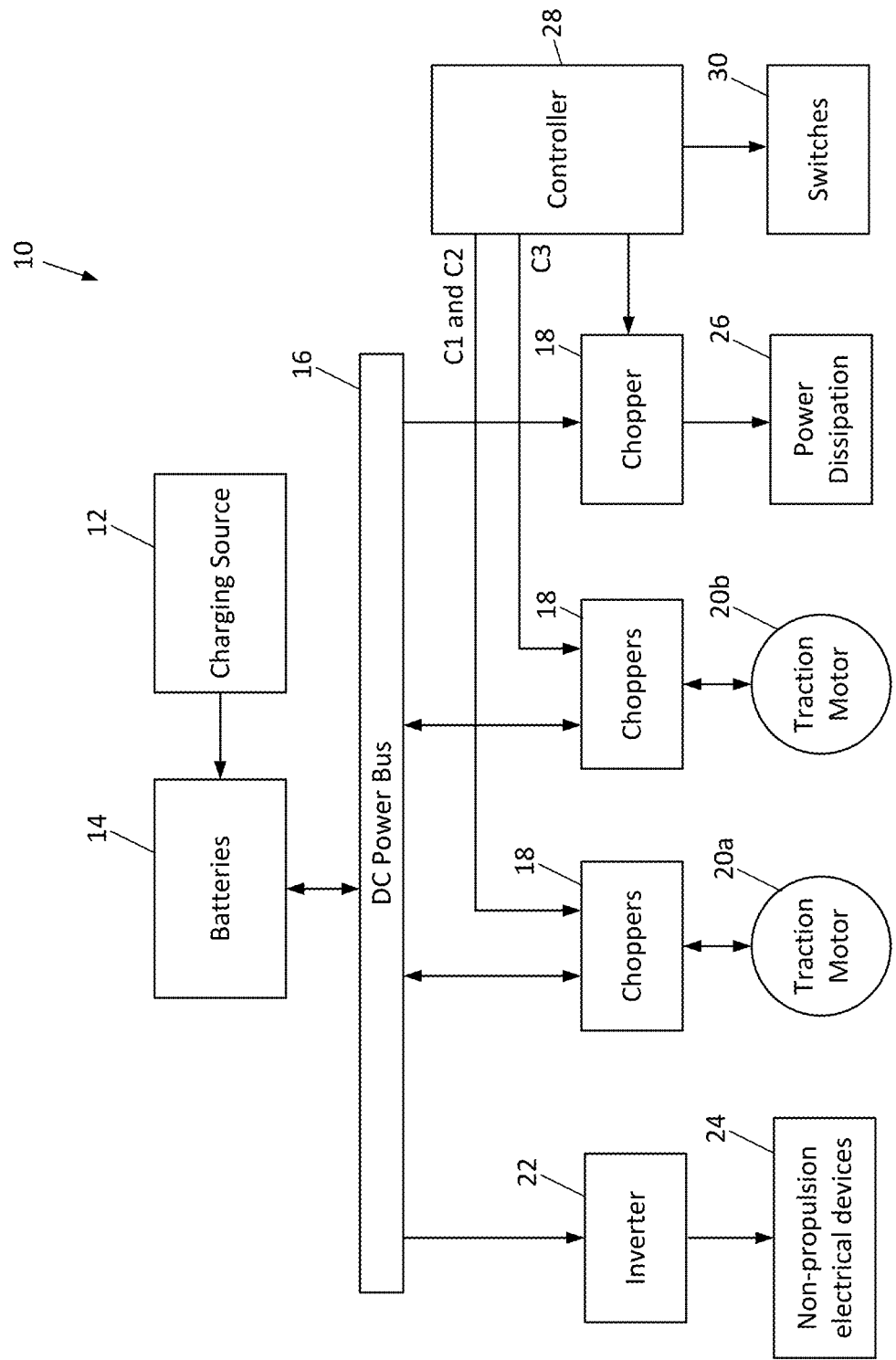
FIG. 1 is a functional block diagram of a battery powered locomotive according to the disclosure.

With initial reference to FIG. 1, a functional block diagram of a preferred embodiment of a battery powered freight locomotive 10 is shown. The locomotive 10 may have a weight ranging from about 120-213 tons, and typically operates at speeds up to about 60 mph. The locomotive 10 may be connected to haul conventional non-powered railcars (as well as additional battery powered locomotives) to provide a battery powered consist. A train consist having more than one of the locomotives 10 will be understood to be able to haul more weight as a multiple of the capabilities of one of the locomotives 10.

As shown in FIG. 1, components of the locomotive 10 include a battery charging source 12, a DC power bus 16, chopper circuits 18, traction motors 20, an inverter 22, non-propulsion electrical devices 24, a power dissipation device 26, a controller 28, and various switches 30.

One component that the locomotive 10 does not include is a prime mover engine. As noted previously, the term "prime mover engine" refers to a locomotive engine having a power output of at least about 1000 horsepower as is equal to the power required for the traction motors of the locomotive to cause continuous movement of the locomotive when operating in a motoring mode. As the term is used herein, "motoring mode" is an operational mode in which the traction motors of the locomotive cause the wheels of the locomotive to continuously turn throughout the operational speed range of the locomotive of up to at least about 60 mph. A typical prime mover engine for a heavy duty freight locomotive has an output power ranging from a minimum of about 1006 horsepower (745 kilowatts) and up to 6000 horsepower (4474 kilowatts) or more, depending on the size of the freight locomotive and its proposed use.

The charging source 12 of the locomotive 10 is preferably a relatively small gas/diesel fuel powered generator. In its role as a battery charger, the charging source 12 generates no more than about 700-850 horsepower (520-630 kilowatts). This is significantly lower than the power provided by even the smallest prime mover engine used on a heavy duty freight locomotive. Thus, because the battery charging source 12 of the locomotive 10 provides less power than the total power required by the traction motors to continuously power the locomotive 10 when operating in the motoring mode, the battery charging source 12 is not a prime mover engine.

In preferred embodiments, the batteries 14 are lithium ion batteries or lithium iron phosphate batteries. However, it will be appreciated that the invention is not limited to any particular battery chemistry. In one preferred embodiment, each of the batteries 14 has a nominal voltage of about 348 VDC, and multiple pairs of series-connected batteries 14 provide a nominal voltage of about 750 VDC to the DC power bus 16.

The DC bus 16 is an electrical power bus that provides a stable DC output from the batteries 14 to various electrical components of the locomotive. In a preferred embodiment, the DC bus 16 includes a DC auxiliary bus 16a, a DC battery bus 16b, and a DC traction bus 16c, as described in more detail hereinafter. The DC bus 16 is desirably configured to maintain a voltage level of about 530 to 800 VDC.

In a preferred embodiment, the chopper circuits 18 are DC-to-DC converters that step up and step down DC power as needed by switching the voltages at their outputs on and off at a rate determined by control signals provided by the controller 28. In a preferred embodiment, the controller 28 generates the control signals based on voltage, current, speed, or torque requests from the locomotive's throttle control. Thus, the DC chopper circuits 18 control the DC power supplied by the DC bus 16 to the traction motors 20 to provide the desired voltage, current, speed, or torque levels as needed for locomotive operation. Generally, the variation in output voltage provided by the DC chopper circuits 18 ranges from 0 VDC to 1100 VDC.

In alternative embodiments, the chopper circuits 18 are DC-to-AC chopper/inverters that step AC power up or down as needed. In these embodiments, the chopper circuits 18 receive DC power from the DC bus 16 and provide the AC power to AC traction motors 20.

In a preferred embodiment, the traction motors 20 are DC motors having armature and field windings that are separately-excited and connected in parallel across the DC bus 16. In alternative embodiments, the traction motors 20 are AC motors that receive AC current through one or more power inverters connected across the DC bus 16.

The inverter 22 converts DC to AC for powering the non-propulsion electrical devices 24. The non-propulsion electrical devices 24 include cooling fans, traction motor blowers, inertial motors and air compressors. The non-propulsion devices 24 can require the equivalent of up to 300 horsepower or more to operate.

The traction motors 20 and all of the non-propulsion electrical devices 24 are powered by the batteries 14. Thus, the locomotive 10 has no need to be connected to an external electrical power source for operating in the motoring mode or the charging mode. However, while at rest at a shore location, the locomotive 10 may be connected to shore electrical power to maintain battery charge levels while the non-propulsion devices 24 are operating.

The controller 28 generates switching control signals to control various switches 30 as described hereinafter. The controller 28 also generates the control signals C1, C2, and C3 that determine the output power provided by the DC chopper circuits 18 in DC traction motor embodiments. In AC traction motor embodiments, the controller 28 generates the control signals C1, C2, and C3 that determine the output power provided by the chopper/inverter circuits.

As described in more detail hereinafter, the locomotive 10 is operative in at least three modes, including a motoring mode, a dynamic braking mode, and a battery charging mode. Some embodiments may also operate in a coasting mode.

Figure 2:
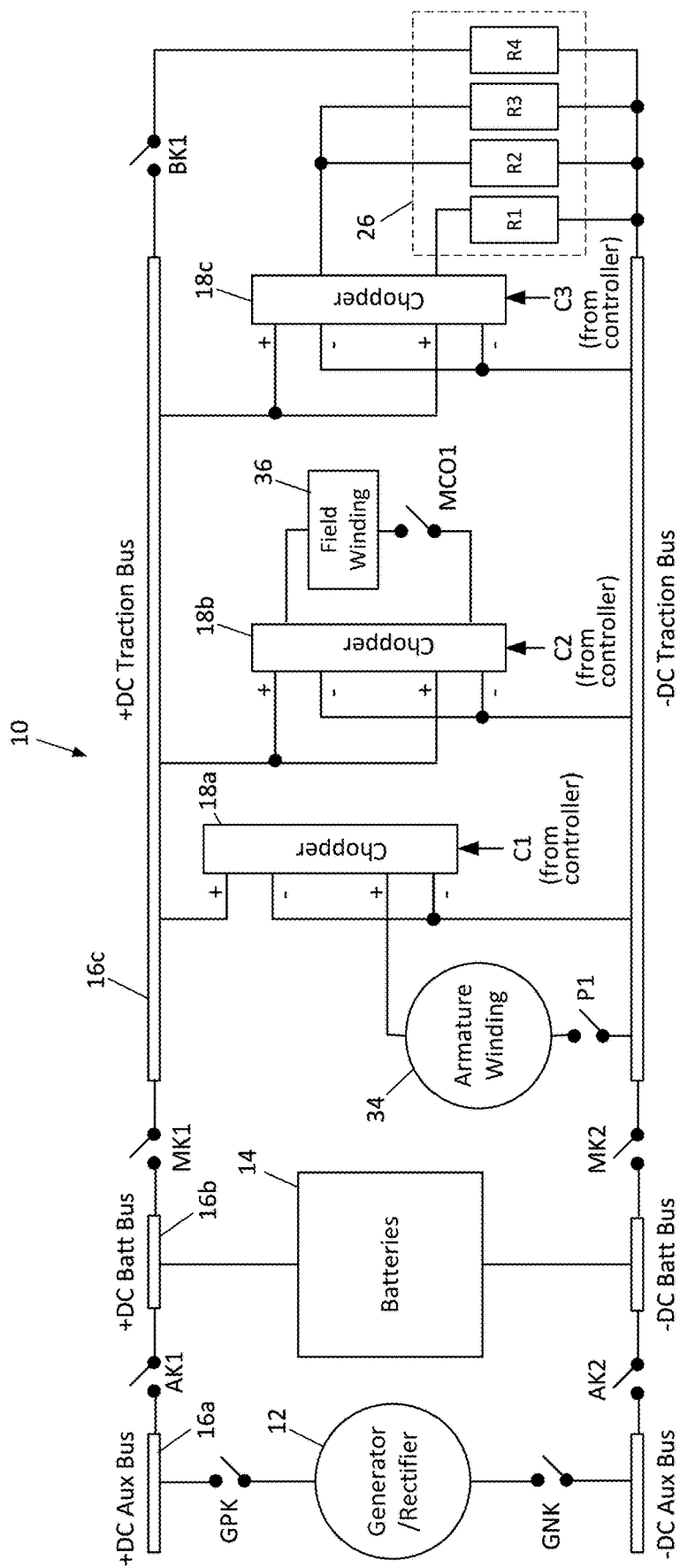
FIG. 2 is a schematic diagram of the battery powered locomotive.

As shown in the schematic diagram of FIG. 2, the battery charging source 12 may comprise a diesel or gasoline powered generator/rectifier connected across the positive and negative terminals of the DC auxiliary bus 16a through the switches GPK and GNK. In a preferred embodiment, the charging source 12 generates a maximum voltage of about 600 VAC that the rectifier converts to a maximum of about 840 VDC. Thus, when the switches GPK and GNK are closed, the charging source 12 provides at least about 750-800 VDC across the DC auxiliary bus 16a. To enhance the simplicity of the description, FIG. 2 depicts only the chopper circuits 18a and 18b that provide power to one traction motor 20a. Each of the other traction motors, such as traction motor 20b, are provided power by other dedicated chopper circuits that are connected to the DC traction bus 16c in the same manner as chopper circuits 18a-18b.

With continued reference to FIG. 2, the batteries 14 are connected across the positive and negative terminals of the DC battery bus 16b, wherein the positive terminal of the DC battery bus 16b is selectively connected to the positive terminal of the DC auxiliary bus 16a through the switch AK1, and the negative terminal of the DC battery bus 16b is selectively connected to the negative terminal of the DC auxiliary bus 16a through the switch AK2. In a preferred embodiment, depending on charge levels, the batteries 14 provide about 530 to 800 VDC across the DC battery bus 16b.

As also shown in FIG. 2, the chopper circuits 18a, 18b, and 18c are connected across the positive and negative terminals of the DC traction bus 16c, wherein the positive terminal of the DC traction bus 16c is selectively connected to the positive terminal of the DC battery bus 16b through the switch MK1, and the negative terminal of the DC traction bus 16c is selectively connected to the negative terminal of the DC battery bus 16b through the switch MK2. The chopper circuit 18a controls the power provided to the armature winding 34 of the traction motor 20a, and the chopper circuit 18b controls the power provided to the field winding 36 of the traction motor 20a. The chopper circuit 18c controls the power provided to the power dissipation device 26, which is a resistor grid in the embodiment of FIG. 2. The resistor grid 26 may include several banks of resistors, such as banks R1, R2, R3, and R4, through which power is selectively dissipated as necessary. In other embodiments, the power dissipation device 26 may comprise a capacitor bank, a flywheel, or other device for dissipating excess power.

Figure 3:
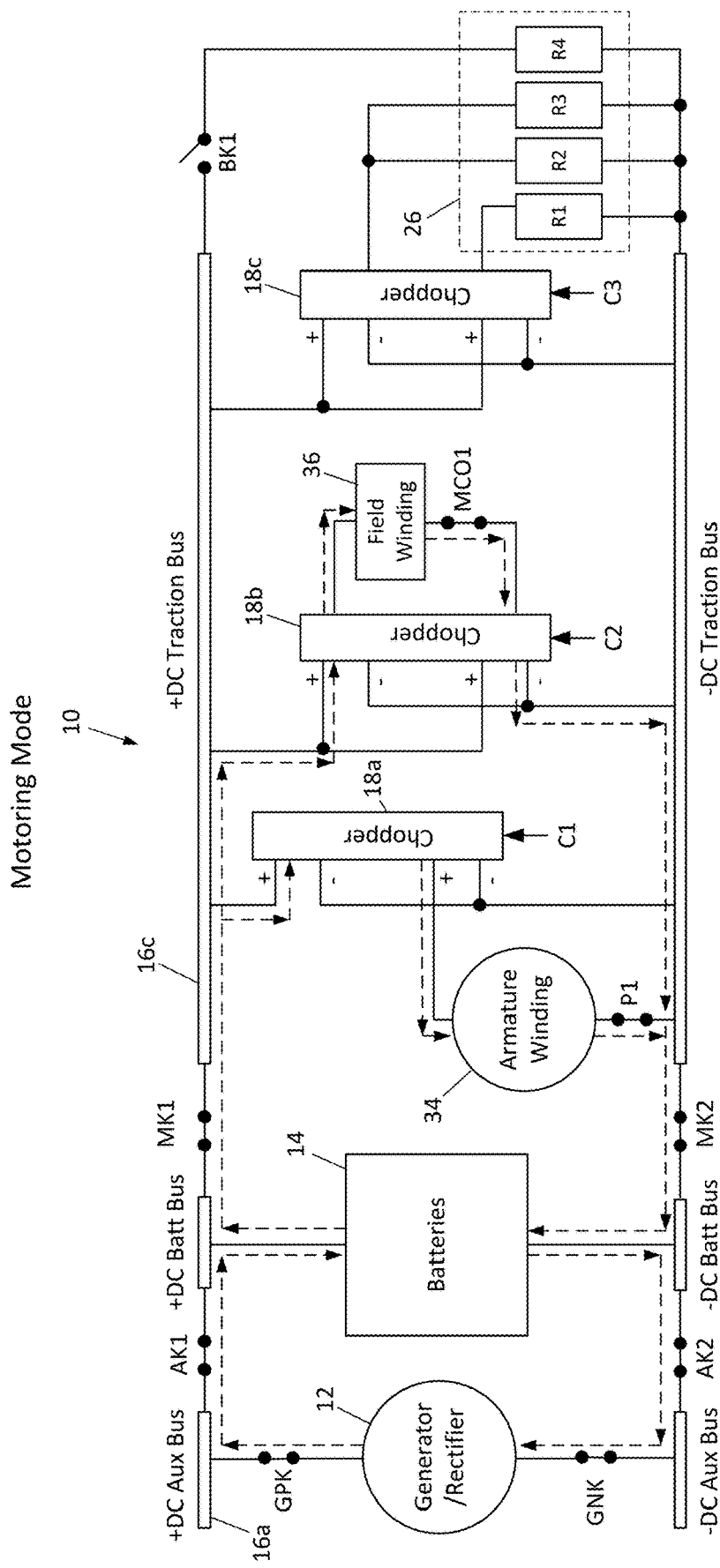
FIG. 3 is a schematic diagram showing electrical power flow when the locomotive is in a motoring mode.

FIG. 3 shows electrical power flow when the locomotive is in the motoring mode, during which power is supplied to the traction motors 20a-20b for powered movement of the locomotive 10. In the motoring mode, the controller 28 controls the states of the switches 30 to provide power from the DC battery bus 16b to the DC traction bus 16c. The controller 28 also provides the control signals C1 and C2 to the chopper circuits 18a and 18b to provide the appropriate power levels to the armature winding 34 and field winding 36 of the traction motor 20a. As shown in FIG. 3, when motoring, the switches MK1 and MK2 are in a closed state so that the DC battery bus 16b provides power to the DC traction bus 16c. The controller 28 sets the switch P1 to the closed state so that the chopper circuit 18a provides power to the armature winding 34 of the traction motor 20a, and the chopper circuit 18b provides power to the field winding 36 of the traction motor 20a. (The switch MC01 maintains a normally-closed state.) In the preferred embodiment, the controller 28 sets control signal C1 to provide power to the armature winding 34 over a range of 0 VDC to 1100 VDC, and sets control signal C2 to provide power to the field winding 36 over a range of 0 VDC to 1100 VDC. Generally, during motoring mode, all available power from the batteries 14 is provided to the traction motors 20, and no power is dissipated in the resistor grid 26.

In preferred embodiments, the signals C1 and C2 control the chopper circuits 18a and 18b to provide approximately the same voltage levels across the armature winding 34 and field winding 36 over most of the operational speed range of the locomotive 10. However, at speeds approaching 65 mph, the control signal C2 controls the chopper circuit 18b to reduce the current in the field winding 36, while the control signal C1 controls the chopper circuit 18a to maintain the current through the armature winding 34. This field weakening is generally performed only with lighter train loads at the higher speeds.

Figure 4:
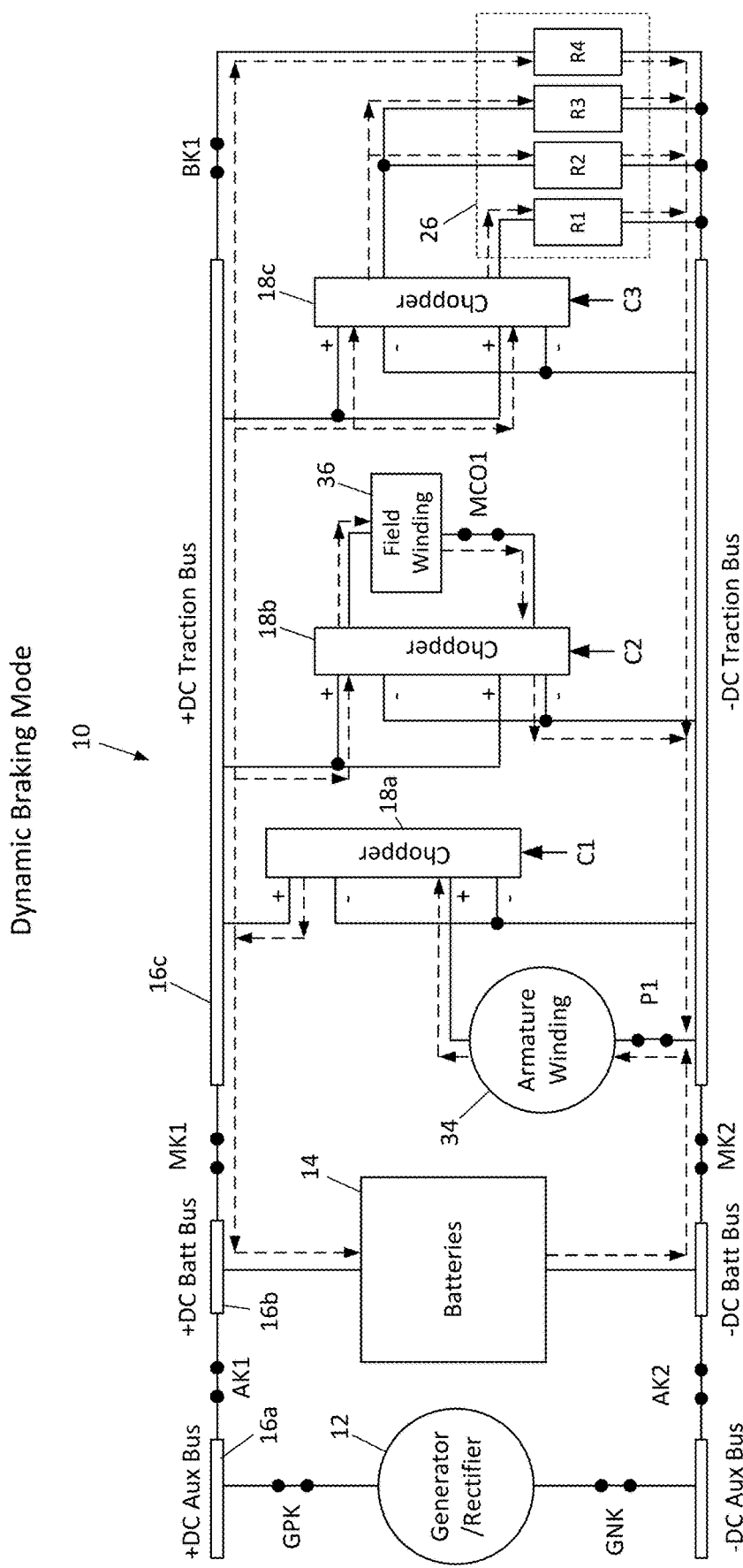
FIG. 4 is a schematic diagram showing electrical power flow when the locomotive is in a dynamic braking mode.

FIG. 4 shows electrical power flow when the locomotive is in the dynamic braking mode. The locomotive 10 utilizes dynamic braking by which the kinetic energy of the moving locomotive 10 is used to cause the traction motors 20 to generate electric current. In the dynamic braking mode, the controller 28 sets the states of the various switches 30 to energize the traction motor windings 34 and 36, thereby causing the traction motors to act as generators. The resistance of the motor field acts as a brake on the locomotive 10, which in turn helps to slow the train. As described in more detail hereinafter, at least some of the electric current generated by the motors 20 in the dynamic braking mode may be used to charge the batteries 14. Current not needed for battery charging may be dissipated as heat in the power dissipation device 26.

With reference to FIG. 4, the controller 28 controls the states of the switches P1, MK1, and MK2 to allow current generated by the armature winding 34 in the dynamic braking mode to flow through the chopper circuit 18a to the positive terminal of the DC traction bus, thereby providing power for charging the batteries 14. In preferred embodiments, the charging voltage provided by the armature winding 34 (acting as a generator) may range from 0 to 780 VDC. In dynamic braking mode, the controller 28 also controls the state of the switch BK 1 and the control signal C3 to direct excess power not needed for battery charging to the power dissipation device 26. In some embodiments, a coasting mode may be implemented in which the controller 28 controls the chopper 18 to divert power generated by the traction motors 20 to the batteries 14 for charging, and if batteries are fully charged, the controller 28 controls the switch BK 1 to allow excess energy to flow to the dissipation device 26.

Figure 5:
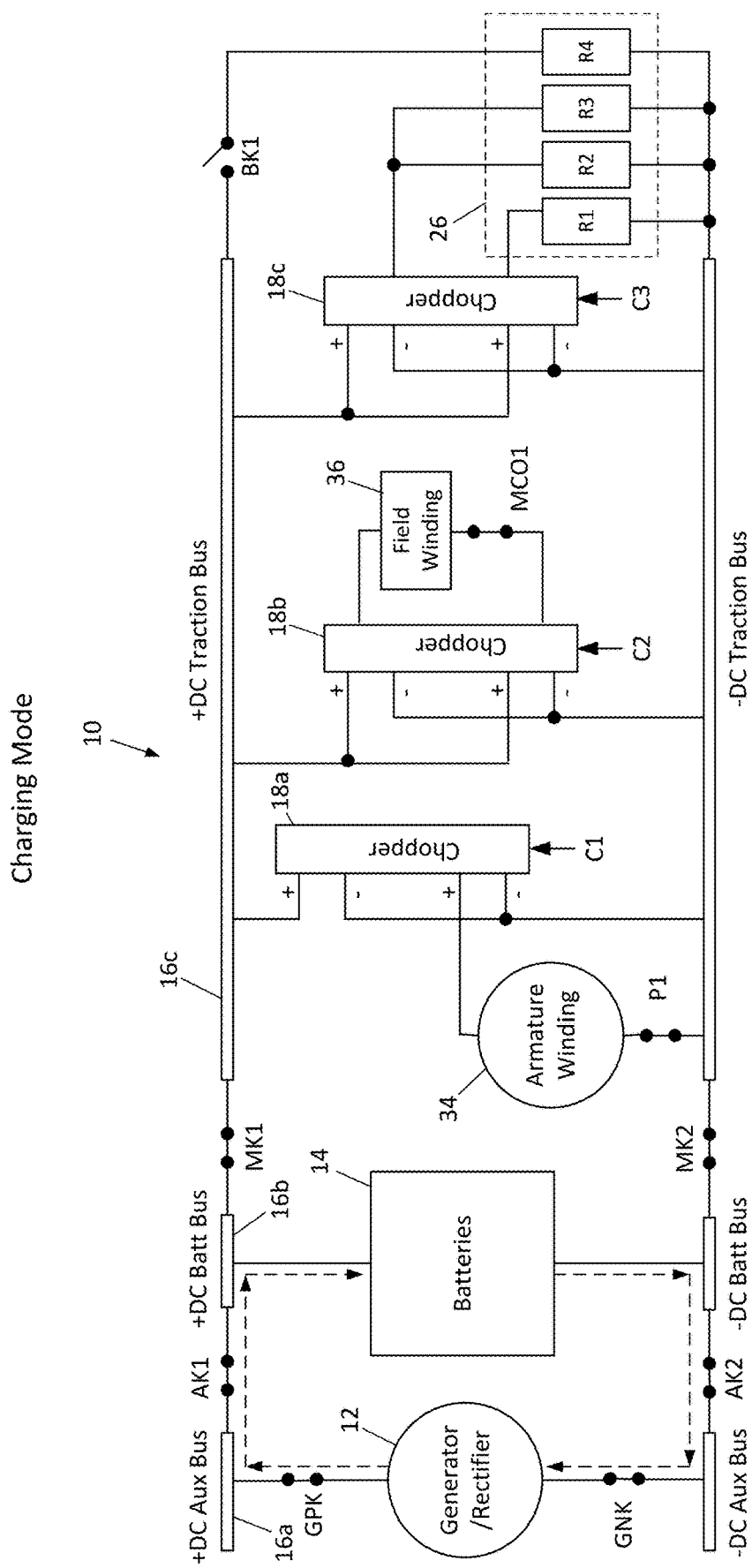
FIG. 5 is a schematic diagram showing electrical power flow when the locomotive is in a battery charging mode.

FIG. 5 shows electrical power flow when the locomotive is in the battery charging mode. In the battery charging mode, the controller 28 controls the states of the switches 30 to provide power from the DC auxiliary bus 16a to the DC battery bus 16b. Specifically, the controller 28 keeps the switches GPK, GNK, AK1, and AK2 in the closed state so that the batteries 14 receive a charging voltage from the charging source 12. In preferred embodiments, the charging voltage provided by the generator/rectifier 12 may range from 530 VDC to 800 VDC. During the battery charging mode, the generator/rectifier 12 charges the batteries while the locomotive is not moving, such as when locomotive is out of service between hauling tasks. Thus, during this mode, the controller 28 sets control signals C1 and C2 so that the chopper circuits 18a-18b provide zero voltage to the armature winding 34 and the field winding 36.

When the voltages on the traction motor windings 34-36 are increased so that the wheels of the locomotive are put in motion, the locomotive transitions into the motoring mode discussed above (FIG. 3), in which the batteries 14 continue to receive a charge from the generator/rectifier 12. Thus, during the motoring mode, the batteries 14, the generator/rectifier 12, and the traction motor windings 34-36 all remain connected to the DC bus 16, and a non-zero voltage is applied to the traction motor windings 34-36, and the batteries 14 continuously charge and discharge as the desired motoring speed is set by the controller 28.

Accordingly, the present device advantageously provides a battery powered locomotive not having a prime mover engine. This yields improved fuel economy, reduced emissions, and lower operational costs.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A locomotive, comprising:
a DC power bus comprising a DC auxiliary bus, a DC battery bus, and a DC traction bus, the DC power bus for providing a DC voltage to components of the locomotive when the locomotive is operating in a motoring mode, a charging mode, or a dynamic braking mode, wherein the DC auxiliary bus is selectively connected to the DC battery bus, and the DC battery bus is selectively connected to the DC traction bus;
a plurality of batteries connected across the DC battery bus for providing power to the DC battery bus when the locomotive is operating in the motoring mode, and receiving power from the DC battery bus when the locomotive is operating in the charging mode and the dynamic braking mode;
one or more traction motors, each traction motor comprising an armature winding and a field winding that are selectively connected in parallel across the DC traction bus, the one or more traction motors operable to receive power from the DC traction bus when the locomotive is operating in the motoring mode, to provide charging power to the DC traction bus when the locomotive is operating in the dynamic braking mode, and to receive no power from the DC traction bus when the locomotive is operating in charging mode;
a charging source connected across the DC auxiliary bus for providing charging power to the DC auxiliary bus, wherein the charging power is less than power requirements of the one or more traction motors when the locomotive is operating in the motoring mode; and
a power dissipation device selectively connected across the DC power bus for receiving and dissipating excess power from the DC power bus when the locomotive is operating in the dynamic braking mode,
wherein when the locomotive is operating in the charging mode, the DC auxiliary bus is connected to the DC battery bus, and
wherein when the locomotive is operating in the motoring mode and when the locomotive is operating in the dynamic braking mode, the DC battery bus is connected to the DC traction bus.

2. The locomotive of claim 1, further comprising:
one or more first switches for selectively connecting the DC auxiliary bus to the DC battery bus;
one or more second switches for selectively connecting the DC battery bus to the DC traction bus;
one or more third switches for selectively connecting the armature winding and the field winding across the DC traction bus; and
a controller for generating control signals to control states of the first, second, and third switches.

3. The locomotive of claim 1, further comprising:
one or more first chopper circuits for controlling a first voltage and first current provided across the armature winding of the one or more traction motors when the locomotive is operating in the motoring mode;
one or more second chopper circuits for controlling a second voltage and second current provided across the field winding of the one or more traction motors when the locomotive is operating in the motoring mode; and
a controller for generating control signals to control the first and second chopper circuits to provide the first voltage, first current, second voltage, and second current.

4. The locomotive of claim 3, further comprising:
the one or more first chopper circuits for controlling a third voltage and third current provided across the armature winding of the one or more traction motors when the locomotive is operating in the dynamic braking mode;
the one or more second chopper circuits for controlling a fourth voltage and fourth current provided across the field winding of the one or more traction motors when the locomotive is operating in the dynamic braking mode; and the controller for generating the control signals to control the first and second chopper circuits to provide the third voltage, third current, fourth voltage, and fourth current.

5. The locomotive of claim 4, further comprising:

one or more third chopper circuits for controlling excess power provided to the power dissipation device when the locomotive is operating in the dynamic braking mode; and the controller for generating the control signals to control the one or more third chopper circuits to provide the excess power to the power dissipation device.

6. The locomotive of claim 3, wherein the one or more first and second chopper circuits provide zero voltage and zero current across the armature and field windings of the one or more traction motors when the locomotive is operating in the charging mode.

7. The locomotive of claim 1, wherein the power dissipation device comprises a resistor grid.

8. The locomotive of claim 1, wherein the charging source comprises an AC generator and rectifier.

9. The locomotive of claim 1, wherein the charging source provides a voltage ranging from about 530 to 800 VDC to the DC power bus.

10. The locomotive of claim 1, wherein the plurality of batteries provide a voltage ranging from about 530 to 800 VDC to the DC power bus.

11. The locomotive of claim 1, wherein the one or more traction motors provide a voltage ranging from about 530 to 800 VDC to the DC power bus when the locomotive is operating in the dynamic braking mode.

12. The locomotive of claim 1, wherein the plurality of batteries provide power to the DC power bus for powering the one or more traction motors at all operational speeds of the locomotive when the locomotive is operating in the motoring mode.

13. The locomotive of claim 1, wherein the one or more traction motors are operable to provide charging power to the plurality of batteries at all operational speeds of the locomotive when the locomotive is operating in the dynamic braking mode.

14. The locomotive of claim 1, wherein the one or more traction motors comprise one or more DC motors, each having an armature winding and a field winding that are separately-excited and connected in parallel across the DC power bus.

15. The locomotive of claim 1, wherein the one or more traction motors comprise one or more AC motors, each receiving AC power through one or more power invertors connected across the DC power bus.

16. The locomotive of claim 3, wherein the one or more first chopper circuits and the one or more second chopper circuits comprise DC chopper circuits.

17. The locomotive of claim 3, wherein the one or more first chopper circuits and the one or more second chopper circuits comprise AC chopper circuits.

\* \* \* \* \*